(12) United States Patent
Abts et al.

(10) Patent No.: US 9,374,949 B2
(45) Date of Patent: Jun. 28, 2016

(54) IRRIGATION SYSTEM WITH HEAT DISSIPATION ASSEMBLIES

(71) Applicant: Irrovation LLC, Omaha, NE (US)

(72) Inventors: Kevin J. Abts, Omaha, NE (US); Gerald L. Abts, Denver, CO (US)

(73) Assignee: Irrovation LLC, Omaha, NE (US)

( * ) Notice: Subject to any disclaimer, the term of this patent is extended or adjusted under 35 U.S.C. 154(b) by 0 days.

(21) Appl. No.: 14/611,475

(22) Filed: Feb. 2, 2015

(65) Prior Publication Data

US 2015/0351334 A1   Dec. 10, 2015

Related U.S. Application Data

(60) Provisional application No. 62/008,539, filed on Jun. 6, 2014.

(51) Int. Cl.
  *A01G 25/09* (2006.01)
(52) U.S. Cl.
  CPC .................................. *A01G 25/092* (2013.01)
(58) Field of Classification Search
  CPC ...... A01G 25/00; A01G 25/09; A01G 25/092
  USPC ................................................. 239/723–749
  See application file for complete search history.

(56) References Cited

U.S. PATENT DOCUMENTS

| | | | | |
|---|---|---|---|---|
| 4,073,309 | A | * | 2/1978 | Fraser .................. A01G 25/092 239/731 |
| 4,074,783 | A | * | 2/1978 | Arndt ................... A01G 25/092 239/728 |
| 4,580,731 | A | | 4/1986 | Kegel et al. |
| 5,255,857 | A | | 10/1993 | Hunt |
| 6,007,004 | A | | 12/1999 | Unruh |
| 6,337,971 | B1 | | 1/2002 | Abts |
| 6,755,362 | B2 | | 6/2004 | Krieger et al. |
| 6,820,828 | B1 | | 11/2004 | Greenwalt |
| 7,384,008 | B1 | | 6/2008 | Malsam |
| 7,584,053 | B2 | | 9/2009 | Abts |
| 8,849,468 | B2 | | 9/2014 | Abts et al. |
| 2002/0008167 | A1 | | 1/2002 | Haberland et al. |
| 2003/0066912 | A1 | | 4/2003 | Krieger et al. |
| 2004/0093912 | A1 | | 5/2004 | Krieger et al. |
| 2006/0027677 | A1 | | 2/2006 | Abts |
| 2007/0267524 | A1 | | 11/2007 | Mack |
| 2010/0032493 | A1 | | 2/2010 | Abts et al. |
| 2013/0018553 | A1 | | 1/2013 | Malsam |
| 2013/0211717 | A1 | | 8/2013 | Abts |
| 2013/0253752 | A1 | | 9/2013 | Grabow |
| 2014/0225747 | A1 | | 8/2014 | Abts |

* cited by examiner

*Primary Examiner* — Christopher Kim
(74) *Attorney, Agent, or Firm* — Dorr, Carson & Birney PC

(57) ABSTRACT

An irrigation system that includes a plurality of interconnected spans that are supported by tower structures. Each tower structure includes a drive assembly with a drive controller controlling its speed, and a heat dissipation assembly mounted to the applicant conduit carrying an applicant, such as irrigation water. The heat dissipation assembly provides cooling via conductive heat transfer to remove heat generated by the drive controller during operation.

3 Claims, 7 Drawing Sheets

IRRIGATION SYSTEM WITH HEAT DISSIPATION ASSEMBLIES

RELATED APPLICATIONS

The present application is based on and claims priority to U.S. Provisional Patent Application 62/008,539, filed on Jun. 6, 2014, which is hereby incorporated by reference in its entirety.

BACKGROUND OF THE INVENTION

1. Field of the Invention

The present invention relates to an irrigation system with heat dissipation assemblies mounted onto the exterior surface of applicant conduits (suitable round pipe sections or tubing also known as span pipes or spans), such applicant conduits capable of carrying an applicant such as irrigation water. More particularly the present invention proposes a new system of using such heat dissipation assemblies mounted onto applicant conduits to provide cooling via conductive heat transfer to remove heat that is generated and accumulated inside the enclosures of variable-speed drive controllers during operation.

2. Description of the Prior Art

Mechanized irrigation systems, such as center pivot or lateral move irrigation systems, typically employ a series of pipe spans supported above a ground surface by tower structures that may include wheels or crawler tracks mounted on the tower structures, that are driven to advance the spans about a field in either a forward movement direction or a reverse movement direction. For the purposes of the present invention, the mechanized irrigation system will be referred to as the irrigation system and the pipes and the tower structures supporting the pipes will be referred to collectively as spans. Each of the spans move relatively independently of the other spans, and the movement of the spans is often performed in a follow the leader type manner in which an end span initially advances in either a forward movement direction or reverse movement direction of the irrigation system, and the remaining intermediate spans follow thereafter.

The forward movement direction or reverse movement direction of the irrigation system is dependent on either a clockwise rotation or counter clockwise rotation of the central shafts of the rotors of the span motors connected to reduction gearboxes that drive the rotation of the wheels contacting the ground surface. The direction of the rotation of the central shafts of the rotors of the span motors are conventionally controlled by conductors supplying power, typically, 3-phase, 480 volt AC (alternating current), to the span motors. Conventional 3-phase induction motors provide inherently high starting torques and high efficiency in operation, typically at 60 Hz (cycles per second), on irrigation systems of the prior art and such motors may also be used as the 3-phase span motors of the present invention.

In the case of 3-phase span motors as conventionally used on center pivots, such span motors typically operate at a fixed span motor RPM (revolutions per minute) of approximately 1,750. Gear reduction is provided to achieve a pace of movement over the ground of the wheels of about 0.8 wheel RPM. Such span motors can also easily be reversed (e.g., clockwise rotation of the central shafts of the rotors of the span motors to counterclockwise rotation of the central shafts of the rotors of the span motors). Reversal of the rotation of the central shafts of the rotors of the span motors is accomplished by simply reconfiguring the connections of any two of the three conductors L1, L2, L3 of the 3-phase supply power using a conventional electromechanical contactor device, typically located at a central control panel (not shown). This feature of 3-phase motors facilitates selecting a clockwise rotation or counter clockwise rotation of the central shafts of the rotors of the span motors, and, in turn, selecting either a forward movement direction or reverse movement direction of the irrigation system. A change in either the forward movement direction or reverse movement direction of the irrigation system is controlled conventionally for both the prior art and for the present invention by simply reconfiguring the connections of any two of the three conductors L1, L2, L3 of the 3-phase supply power.

Another convention of irrigation systems for the prior art is the use fixed-speed drive assemblies that may include an alignment detector with one or more single-pole, double-throw (SPDT) switches that are wired to receive either a forward movement direction signal or a reverse movement direction signal depending on either a forward movement direction or a reverse movement direction. These typical SPDT switches control the span motors of the fixed-speed drive assembly on and off while the irrigation system is moving in either a forward movement direction or a reverse movement direction. The discrete forward and reverse movement direction signals are communicated to the switches that each serve to signal two distinct states of alignment to control the 3-phase span motors on and off using a fixed-speed drive controller (e.g., electromechanical contactor or motor starter) of the fixed-speed drive assembly. Such forward and reverse movement direction signals are typically communicated to the switches using separately configured circuits as compared to the three conductors L1, L2, L3 of the 3-phase supply power that are configured to supply electrical power to the span motors.

In an example of the prior art, a forward movement direction signal may be present in a forward movement direction, and a reverse direction signal may be present in a reverse movement direction. In operation, conventional center pivot controls include both a forward movement direction signal and a reverse movement direction signal; however, only one of the two movement direction signals is present in a respective movement direction. Furthermore, the respective forward movement direction signal and reverse movement direction signal are each typically configured to cause the switches to signal the fixed-speed drive controller to control the span motors on and off in an opposite manner with regard to maintaining span alignment. For example, with the same state of alignment, a forward movement direction signal may be configured by the fixed-speed drive controller to control the span motor on and a reverse movement direction signal may be configured by the fixed-speed drive controller to control the span motor off.

The span motor of an intermediate span is typically controlled from span motor on to span motor off and span motor off to span motor on by a fixed-speed drive controller that monitors the output of the corresponding alignment detector that may include a single-pole, double-throw switch. Conventionally, in the prior art, the span motor RPM is not varied other than when the span motor is controlled from span motor on to span motor off and span motor off to span motor on. Such switch signals a discrete (i.e., binary logic, or two-state) on/off signal switch state to cycle control the span motor in an on/off manner. The switch may be located at spans adjacent to the flexible junctures where adjacent spans are interconnected. Relative movement of adjacent spans actuates these switches and, for example, enables the signaling of two distinct states of alignment of adjacent interconnected spans, such as that caused by the forward movement of an outer span about the flexible juncture of two adjacent spans. For example, the wheels of a lagging intermediate tower structure are driven in a forward movement direction by the rotation of one or more cams, rotated by one or more rods (e.g., mechanical linkage), that rotate against the roller-actuating arm of a corresponding switch that causes the internal contacts of the respective switch to close in a conventional single-pole, double-throw method that results in an "on" signal switch state controlling the 3-phase span motor on. Furthermore, in this example, the supply power supplied to the span motor may be configured to rotate the central shaft of the rotor of such span motor in a clockwise rotation and, thereby, the span is driven in a forward movement direction by a respective fixed-speed drive assembly until a substantial straight alignment is restored between the adjacent spans (i.e., respective intermediate tower structure not lagging and not leading). The switches signal two distinct states of alignment based on either a forward movement direction or a reverse movement direction and on a closed switch contact or an opened switch contact that results in either a span motor "on" control or a span motor "off" control.

The fixed-speed drive assemblies incorporating the span motors are, therefore, alternately and repeatedly controlled "on" and "off" by way of a discrete "on" signal switch state or "off" signal switch state. The wheels of the intermediate tower structures may each be driven in either a forward movement direction or a reverse movement direction at a uniform speed with closed switch contacts and stopped with opened switch contacts. This process is repeated by each successive intermediate tower structure of the irrigation system until all of the spans are brought into substantial straight alignment. Each time a tower structure is advanced in either a forward movement direction or a reverse movement direction, a new distinct state of alignment is signaled by the corresponding switch and the process is repeated.

In center pivot irrigation systems, the radially-outermost tower structure (or end tower structure) typically leads the movement of the spans of the irrigation system, while in a lateral move irrigation system either one of the end tower structures typically leads the movement of the spans of the irrigation system. In a center pivot irrigation system, the outermost or end span wheel track has the largest circumference; and, therefore, the end span has the farthest distance to travel. In the prior art, the intermediate spans have relatively smaller wheel track circumferences and therefore can always keep up with the pace of the end span while using substantially the same fixed-speed span motors, assuming similar wheel tire sizes and gearing ratios.

This conventional manner of movement and substantial straight alignment of the spans of irrigation systems requires countless starts-and-stops by the intermediate tower structures, and the corresponding fixed-speed drive assemblies that move them. The number of repeated on-and-off control cycles of the corresponding span motor providing the movement for a respective intermediate tower structure can exceed one thousand a day during continuous operation. This repeated on-and-off control cycling of the corresponding span motors, which is repeated every day, all day, that the irrigation system is operating, causes excessive wear on the electrical components, structural components, and mechanical parts of the fixed-speed drive assembly, especially the span motors, knuckles and gearboxes transferring power to the wheels.

To mitigate the stress on the irrigation system caused by the repetitive start-and-stop movement of fixed-speed drive assemblies typically utilizing alignment detectors as discussed above, movement control systems have been proposed to provide a relatively smooth and continuous movement of the intermediate spans and their respective intermediate tower structures. These continuous movement control systems typically employ potentiometers or other analog sensors, such as capacitive displacement sensors, strain gauge sensors, non-contact proximity sensors or other devices capable of quantifiably measuring a precise degree of span alignment. Analog alignment sensor signals vary in magnitude in direct correlation or proportion to the degrees of deviation in alignment of one span with respect to adjacent interconnected spans. Such analog alignment sensor signals are monitored and processed by variable-speed drive controllers configured to vary aspects of the supply power (i.e., vary the speed) furnished to the corresponding span motor. This, in turn, varies the span motor RPM that, in turn, varies the RPM of the wheels in response to changing analog alignment sensor signals. These analog type sensors are in lieu of typical rod and switch actuators and cams or similar discrete signaling devices that merely use a switch to signal if the state of alignment is beyond a preset maximum value, as is the case with the conventional systems of the prior art for center pivot irrigation system movement control systems.

The variations in the magnitude or intensity of analog sensor signals are monitored and processed by variable-speed drive controllers that, in turn, vary aspects of the supply power (i.e., vary the speed) furnished to the corresponding span motors turning the wheels of the intermediate tower structures in substantially direct correlation or proportion to the degrees of deviation in alignment as detected and outputted by the analog sensors, such that detection of greater angles of deviation in alignment of the interconnected spans results in relatively faster span motor speeds, and detection of relatively lower angles of deviation in alignment results in relatively slower span motor speeds. Such means of varying span motor speeds in direct proportion to the degrees of deviation in alignment as detected and outputted by the analog sensors (i.e., the selected speed of the variable-speed drive controller is based upon the alignment) to maintain substantial straight alignment of the spans with continuous movement requires the span motors to constantly transition between faster speeds and slower speeds (i.e., transient state speeds of movement) as opposed to evolving to unchanging fixed-speeds (i.e., steady state speeds of movement).

Krieger (U.S. Pat. No. 6,755,362), Malsam (U.S. Patent App. Pub. No. 2013/0018553) and Grabow (U.S. Patent App. Pub. No. 2013/0253752) have proposed to provide a relatively smooth and continuous movement and substantial straight alignment of spans using potentiometers or other analog sensors or, in the case of Grabow, GPS (global positioning system) data is used as a means of generating analog alignment sensor signals for varying span motor speeds in direct proportion to the degrees of deviation in alignment.

In operation, variable-speed drive controllers may generate excessive heat and be sensitive to heat accumulation. It is, therefore, generally desirable and often necessary or critical to remove the accumulated heat from the variable-speed drive controllers. Further, operation of the variable-speed drive controllers on an irrigation system exposes such variable-speed drive controllers to environmental conditions in the agricultural field that can include extreme heat and high solar radiation, which makes the effective and sufficient dissipation of accumulated heat from the variable-speed drive controller difficult.

The relatively warm and often hot air temperatures of an agricultural field can render the conventional convection heat transfer techniques (such as heat dissipating fins typically used with variable-speed drive controllers) less effective due to the relatively high ambient air temperatures. Moreover, techniques for enhancing convective cooling, such as cooling fans, may be inadequate in these high heat environments. In addition, such cooling fans often fail due to dust build up, water vapor, and insect activity inside the enclosures of the variable-speed drive controllers.

SUMMARY OF THE INVENTION

Irrigation is typically needed during the hottest and driest times of the year. The inventors recognize that the irrigation water (applicant) carried by the applicant conduits of irrigation systems may be available as a heat sink for dissipating the heat generated by the operation of variable-speed drive controllers. Furthermore, the applicant is often drawn from deep wells or moved through underground pipes; and the water may be many degrees cooler than the surrounding environmental air. The cool water flowing through the applicant conduits continuously draws heat from the applicant conduits, effectively cooling the applicant conduits and elements attached to the applicant conduits. Therefore, conduction of heat generated by and accumulated around the variable-speed drive controller (as well as other heat-generating components of the irrigation system) to the applicant flowing through the irrigation system may provide a lower cost and more effective means of cooling the variable-speed drive controller passively with no moving mechanical parts and minimal maintenance.

The present invention discloses an irrigation system that includes multiple interconnected spans, comprising applicant conduits (suitable round pipe sections or tubing also known as span pipes or spans), that are supported by multiple tower structures. Each intermediate tower structure and end tower structure may include a variable-speed drive assembly that may include a variable-speed drive controller controlling the speed of movement of the variable-speed drive assembly. In addition, the present invention proposes heat dissipation assemblies for such irrigation system, such heat dissipation assemblies mounted onto applicant conduits, such applicant conduits capable of carrying an applicant such as irrigation water. More particularly the present invention proposes a new system of using such heat dissipation assemblies mounted onto the exterior surface of applicant conduits to provide cooling via conductive heat transfer to remove heat that is generated and accumulated inside the enclosures of variable-speed drive controllers during operation.

The heat dissipation assembly of the present invention may comprise a saddle for mounting such heat dissipation assembly onto the applicant conduit of the span, with the saddle having an applicant conduit interface surface for positioning such saddle onto the exterior surface of the applicant conduit to facilitate conduction of heat from the saddle to the applicant conduit. The variable-speed drive controller may include a base surface. The saddle may have a saddle platform configured for suitable mounting to the base surface of the variable-speed drive controller, such that heat from such variable-speed drive controller, with its base surface mounted onto the saddle platform, is conducted through the saddle to the applicant conduit and, in turn, to the applicant fluid (e.g., water) carried by the applicant conduit. Such variable-speed drive controller may be conventional and of the prior art described herein.

BRIEF DESCRIPTION OF THE DRAWINGS

The detailed description is described with reference to the accompanying figures.

DETAILED DESCRIPTION OF THE INVENTION

Overview.

The present invention discloses an irrigation system that includes multiple interconnected spans, comprising applicant conduits (suitable round pipe sections also known as span pipes), that are supported by multiple tower structures. Each intermediate tower structure and end tower structure may include a variable-speed drive assembly that may include a variable-speed drive controller controlling the speed of movement of the variable-speed drive assembly. In addition, the present invention proposes heat dissipation assemblies for such irrigation system, such heat dissipation assemblies mounted onto applicant conduits, such applicant conduits capable of carrying an applicant such as irrigation water. More particularly the present invention proposes a new system of using such heat dissipation assemblies mounted onto the exterior surface of applicant conduits to provide cooling via conductive heat transfer to remove heat that is generated and accumulated inside the enclosures of variable-speed drive controllers during operation.

The heat dissipation assembly of the present invention may comprise a saddle for mounting such heat dissipation assembly onto the applicant conduit of the span, with the saddle having an applicant conduit interface surface for positioning such saddle onto the exterior surface of the applicant conduit to facilitate conduction of heat from the saddle to the applicant conduit. The variable-speed drive controller may include a base surface. The saddle may have a saddle platform configured for suitable mounting to the base surface of the variable-speed drive controller, such that heat from such variable-speed drive controller, with its base surface mounted onto the saddle platform, is conducted through the saddle to the applicant conduit and, in turn, to the applicant fluid (water) carried by the applicant conduit. Such variable-speed drive controller may be conventional and of the prior art described herein.

Prior Art.

Figure 1A:
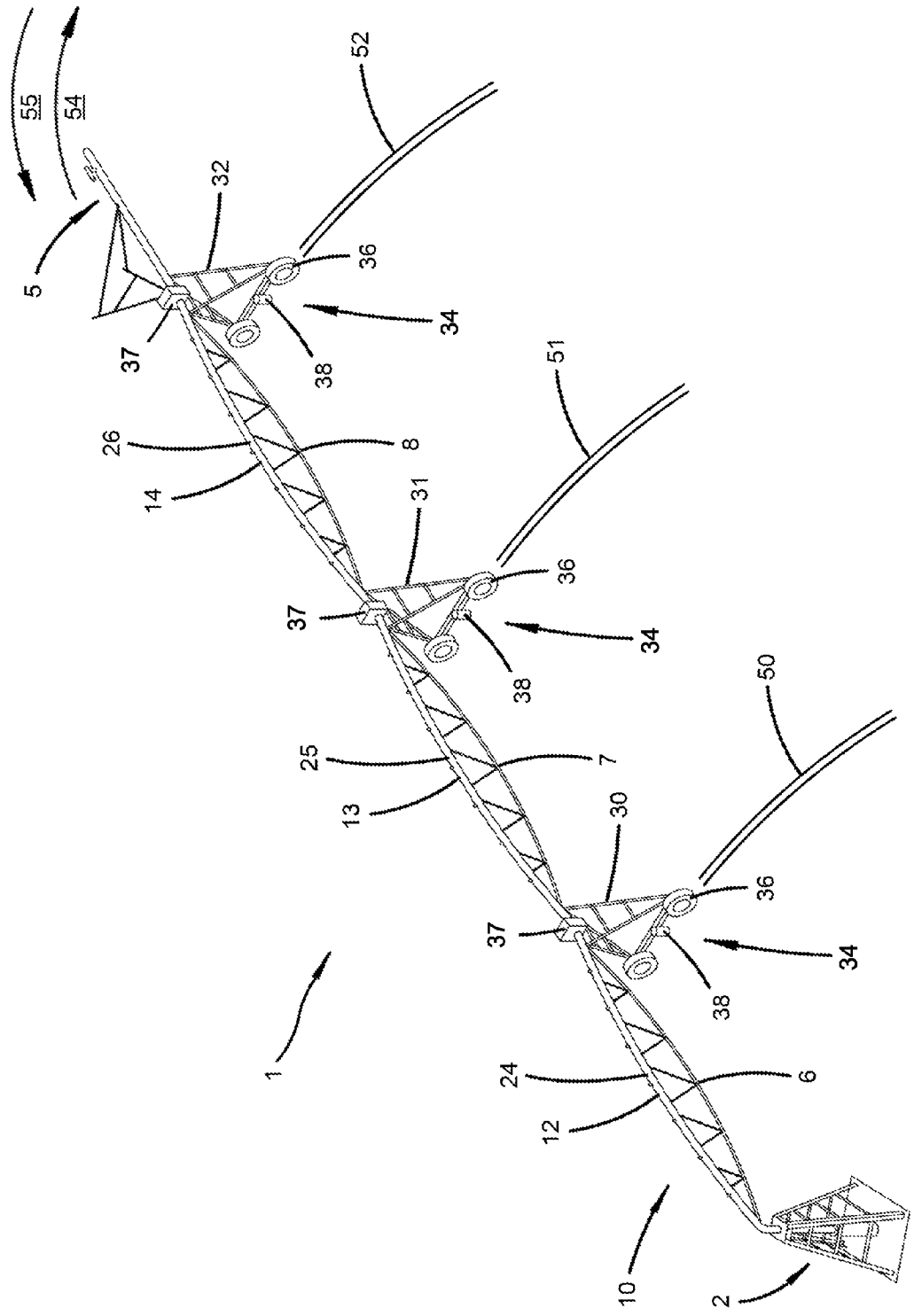
FIG. 1A is an isometric diagrammatic perspective view of an irrigation system with fixed-speed drive assemblies in accordance with an example implementation of the prior art.
Figure 1B:
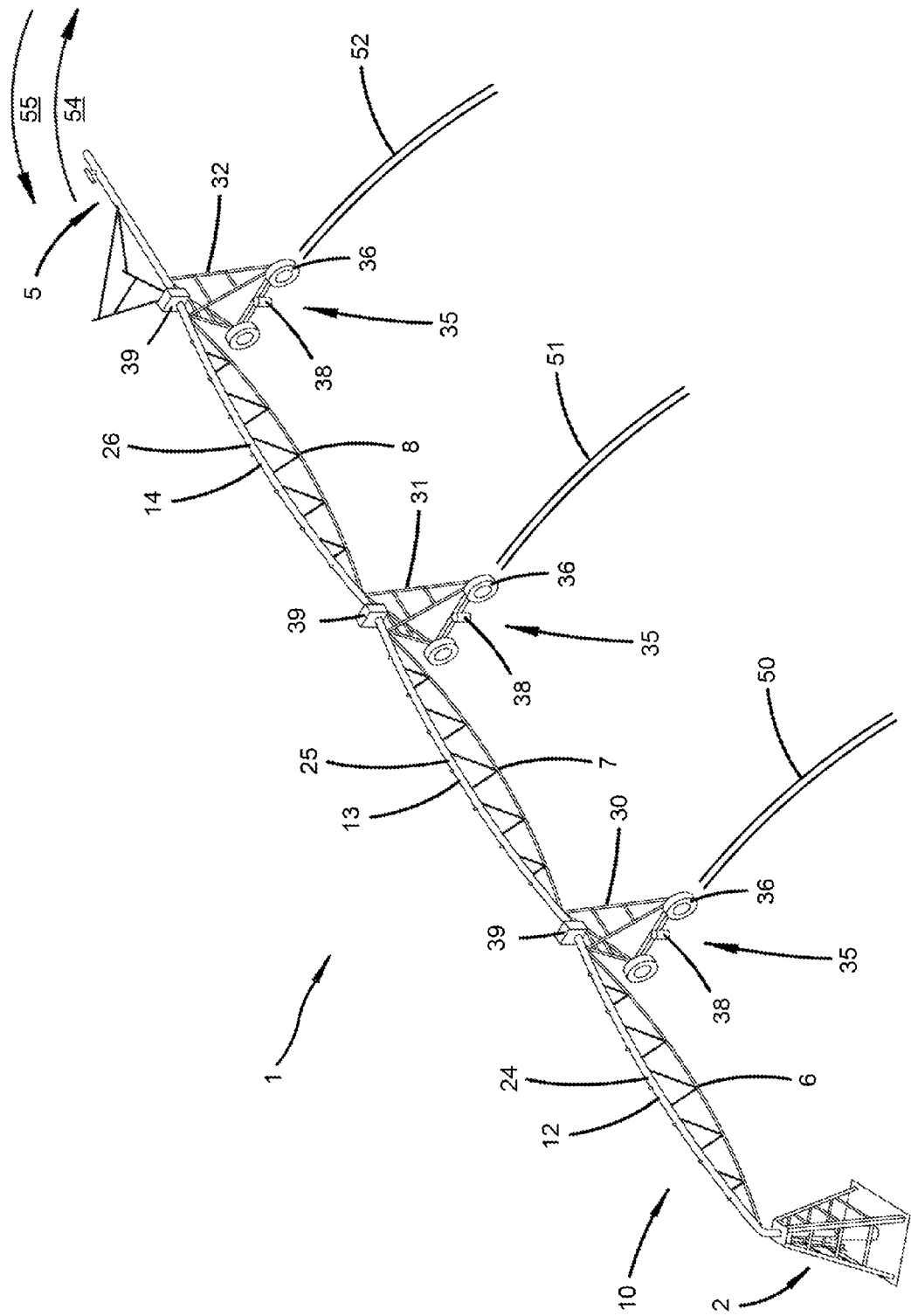
FIG. 1B is an isometric diagrammatic perspective view of an irrigation system with variable-speed drive assemblies in accordance with an example implementation of the prior art.

FIGS. 1A and 1B illustrate a self-propelled (e.g., mechanized) irrigation system 1 in accordance with embodiments of the prior art. Examples of self-propelled irrigation systems include a center pivot irrigation system 1, a linear move irrigation system (not shown), or the like. FIG. 1A and 1B illustrate embodiments of the prior art wherein the irrigation system 1 is a center pivot irrigation system. As shown, the irrigation system 1 may include a center pivot point structure 2, a main section assembly 10 (irrigation section assembly) coupled (e.g., connected) to the center pivot point structure 2. The center pivot point structure 2 has access to a water source to furnish water to the irrigation system 1.

Figure 2A:
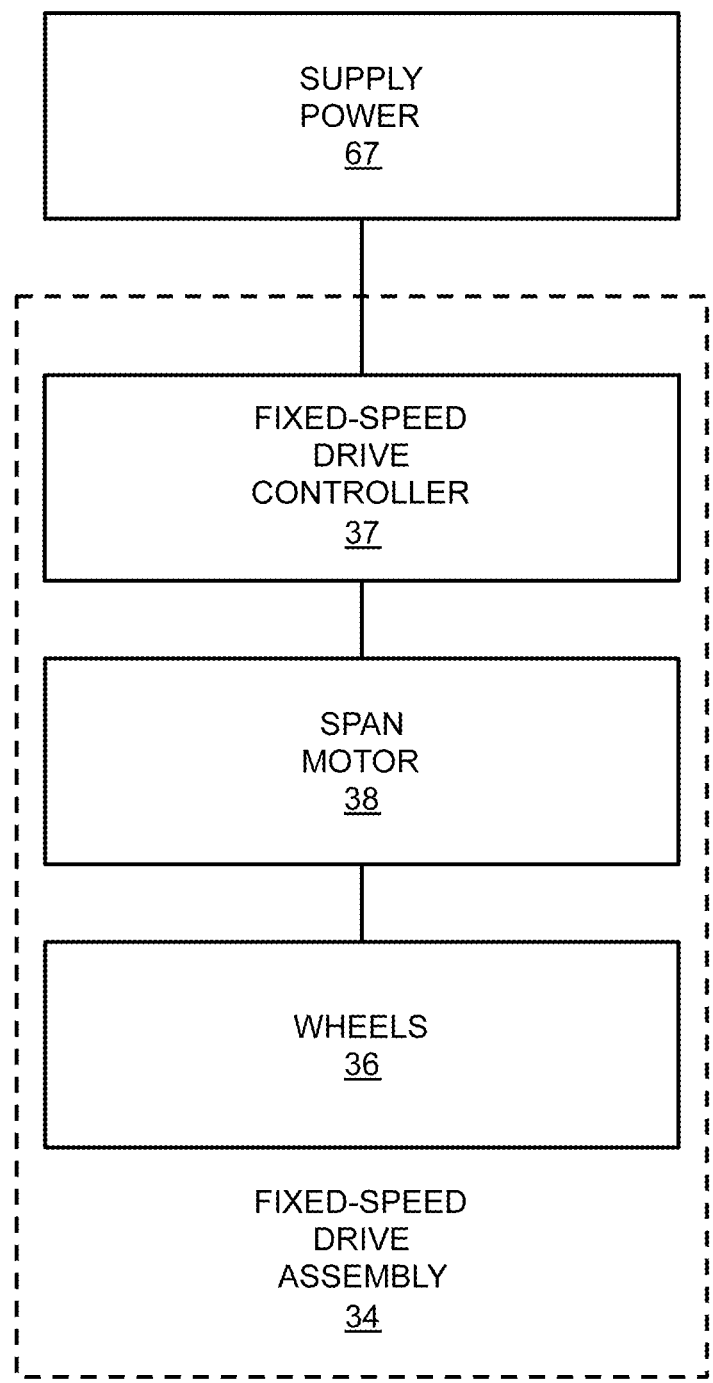
FIG. 2A is a block diagram illustrating the selected elements of the fixed-speed drive assembly of the irrigation system shown in FIG. 1A in accordance with an example implementation of the prior art.

FIG. 2A illustrates a fixed-speed drive assembly 34 typical of conventional irrigation systems 1. Each fixed-speed drive assembly 34 may include a span motor 38, wheels 36, and a fixed-speed drive controller 37. The fixed-speed drive controller 37 typically used in the prior art is an electromechanical contactor or motor starter that controls the repeated on-and-off control cycling of each corresponding span motor 38, such repeated on-and-off control cycling of each corresponding span motor 38 being necessary to control the speed of movement in either a forward movement direction 54 or a reverse movement direction 55 while the irrigation system 1 is operating.

Figure 2B:
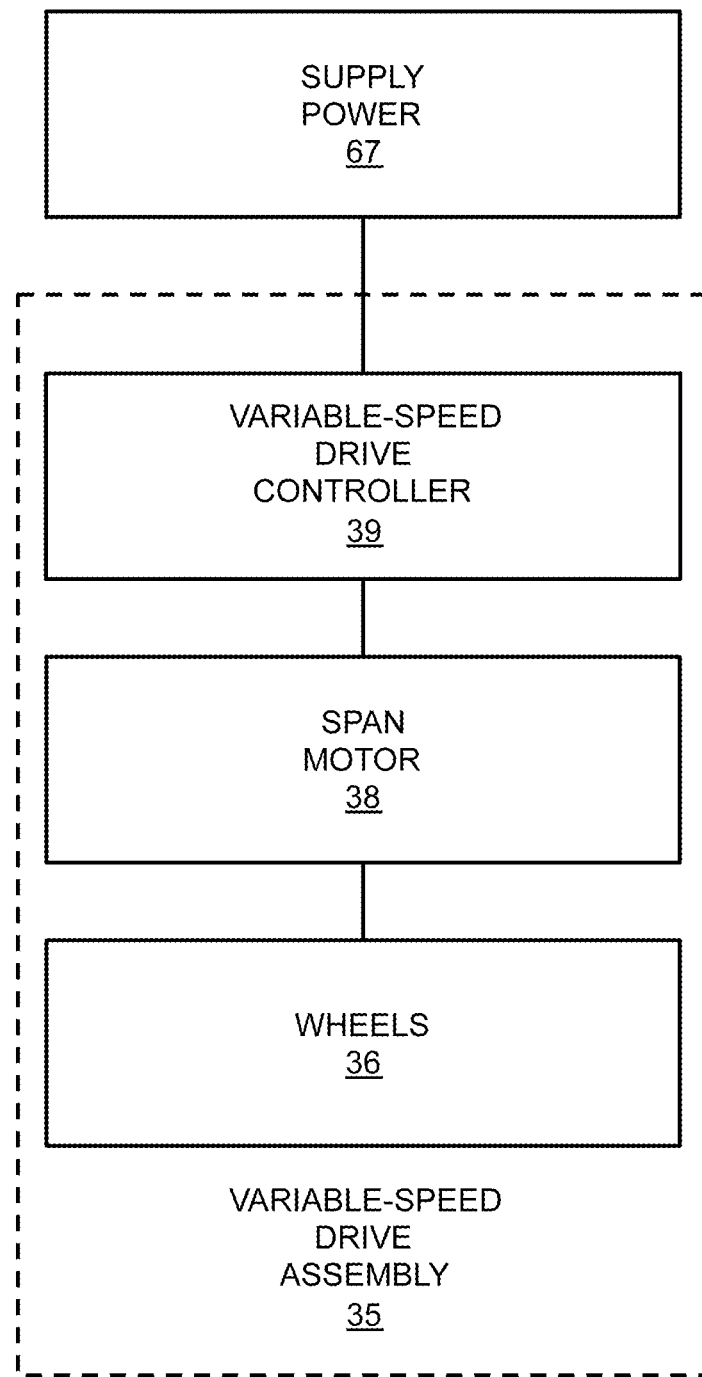
FIG. 2B is a block diagram illustrating the selected elements of the variable-speed drive assembly of the irrigation system shown in FIG. 1B in accordance with an example implementation of the prior art.

FIG. 2B illustrates a variable-speed drive assembly 35 typical of conventional irrigation systems 1. Each variable-speed drive assembly 35 may include a span motor 38, wheels 36, and a variable-speed drive controller 37. The variable-speed drive controller 37 typically used in the prior art is a VFD (variable frequency drive) or similar device that controls the selected speed of each corresponding span motor 38, such selected speeds of each corresponding span motor 38 being necessary to control the speed of movement in either a forward movement direction 54 or a reverse movement direction 55 while the irrigation system 1 is operating.

Example Implementations of the Present Invention.

Figure 1C:
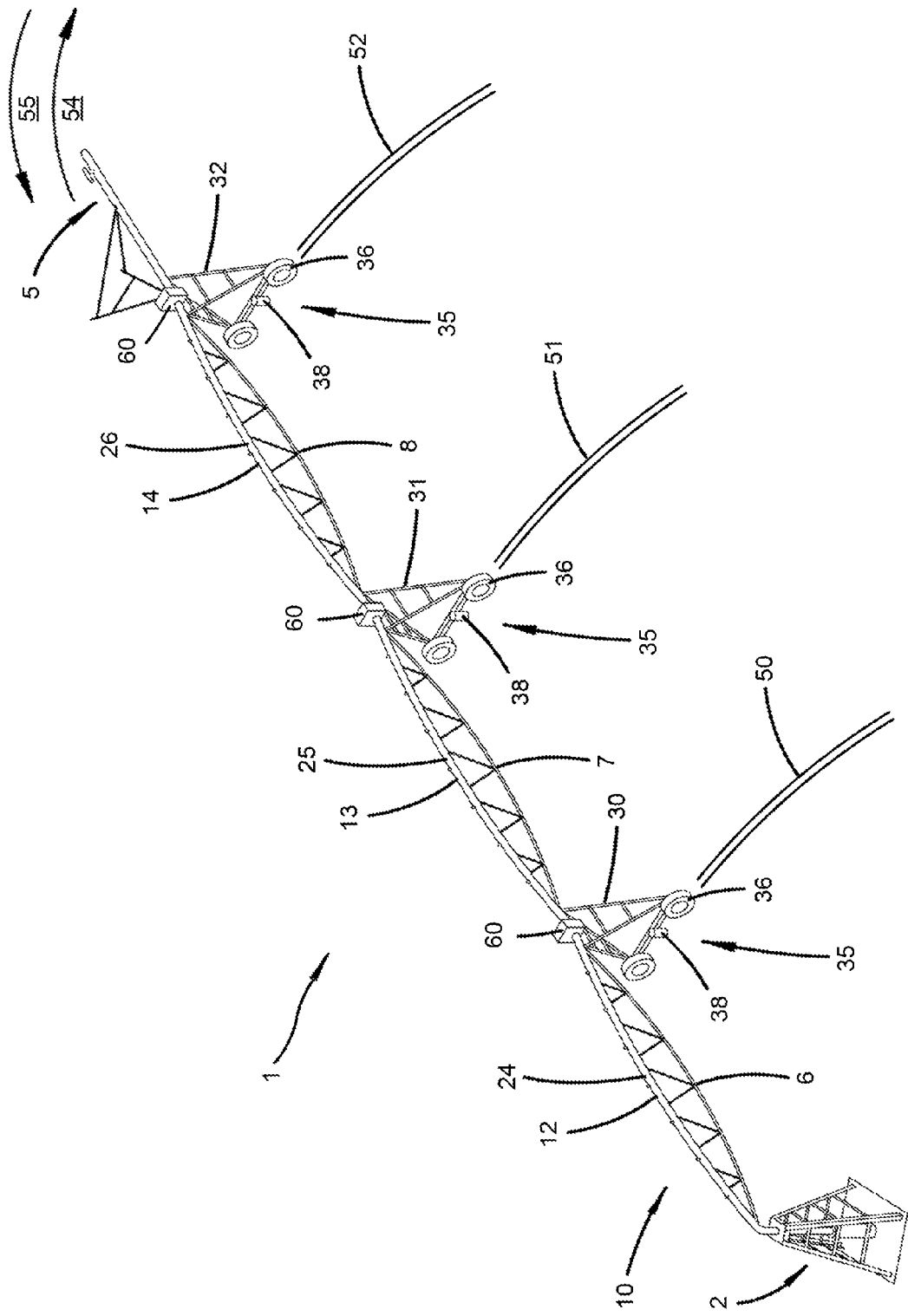
FIG. 1C is an isometric diagrammatic perspective view of an irrigation system with variable-speed drive assemblies and with heat dissipation assemblies in accordance with an example implementation of the present invention.

FIG. 1C illustrates a self-propelled (e.g., mechanized) irrigation system 1 in accordance with embodiments of the present invention. Examples of self-propelled irrigation systems include a center pivot irrigation system 1, a linear move irrigation system (not shown), or the like. FIG. 1C illustrates embodiments of the present invention wherein the irrigation system 1 is a center pivot irrigation system. As shown, the irrigation system 1 may include a center pivot point structure 2, a main section assembly 10 (irrigation section assembly) coupled (e.g., connected) to the center pivot point structure 2. The center pivot point structure 2 has access to a water source to furnish water to the irrigation system 1.

The main section assembly 10 includes a number of interconnected intermediate spans 12, 13 with applicant conduits 24, 25 that are each supported by a truss-type framework structure 6, 7 and by one or more intermediate tower structures 30, 31 and an interconnected end span 14 with applicant conduit 26 that is supported by a truss-type framework structure 8 and by an end tower structure 32. The intermediate tower structures 30, 31 and end tower structure 32 are configured to travel about the center pivot point structure 2 in a circular path that creates wheel tracks 50, 51, 52. The intermediate tower structures 30, 31 and end tower structure 32 may be any tower configuration known in the art to adequately support the applicant conduits 24, 25, 26, (e.g., pipes) described herein. It is to be understood that the main section assembly 10 may include any number of spans 24, 25, 26 and intermediate tower structures 30, 31 and end tower structure 32. The direction of travel for the main section assembly 10 can be either a forward movement direction 54 or a reverse movement direction 55.

The intermediate tower structures 30, 31 and the end tower structure 32 each may include one or more wheels 36, to assist in traversing the irrigation system 1 so as to pivot the main section assembly 10 about a ground surface, cultivation area or field in a forward movement direction 54 or a reverse movement direction 55 along wheel tracks 50, 51, 52. As shown in FIGS. 1A, 1B and 1C each intermediate span 12, 13 and end span 14 may include applicant conduits 24, 25, 26 (e.g., pipes) that are configured to carry liquid (e.g., applicant) along the length of the irrigation system 1 to one or more applicant dispersal assemblies that are configured to irrigate the cultivation area. Each conduit 24, 25, 26 may be coupled to one another to allow fluid communication between each conduit. In an implementation, the applicant conduits 24, 25, 26 may be supported by truss-type framework structures 6, 7, 8. Thus, the main fluid displacement device may be configured to displace applicant through the applicant conduits 24, 25, 26. As shown in FIGS. 1A, 1B and 1C, the irrigation system 1 also may include a cantilevered boom structure 5 that extends outwardly from the end tower structure 32.

With reference to FIG. 2A, it should be noted that typically the same electromechanical contactor device, typically located at a central control panel (not shown) and controlled by an operator, configures supply power 67 to set the rotation of the central shafts of the rotors of span motors 38 to result in either a forward movement direction 54 or a reverse movement direction 55.

With reference to FIG. 2B, each variable-speed drive assembly 35 may include a span motor 38, wheels 36, and a variable-speed drive controller 39 that varies aspects of the supply power 67 (i.e., varies the speed) furnished to the corresponding span motor 38.

In an example implementation of the present invention, one or more intermediate tower structures 30, 31 and end tower structure 32 may be controlled by a suitable variable-speed drive assembly 35 to assist in traversing the irrigation system 1 over a respective ground surface, cultivation area or field. For example, each intermediate tower structure 30, 31 and end tower structure 32 may include a variable-speed drive assembly 35 to propel the respective intermediate tower structure 30, 31 and end tower structure 32 over a respective ground surface, cultivation area or field in either a forward movement direction 54 or a reverse movement direction 55.

As described above, the variable-speed drive assembly 35 may incorporate one or more span motors 38 configured to drive the irrigation system 1 in a forward movement direction 54 or a reverse movement direction 55 based on the configuration of supply power 67.

Figure 3A:
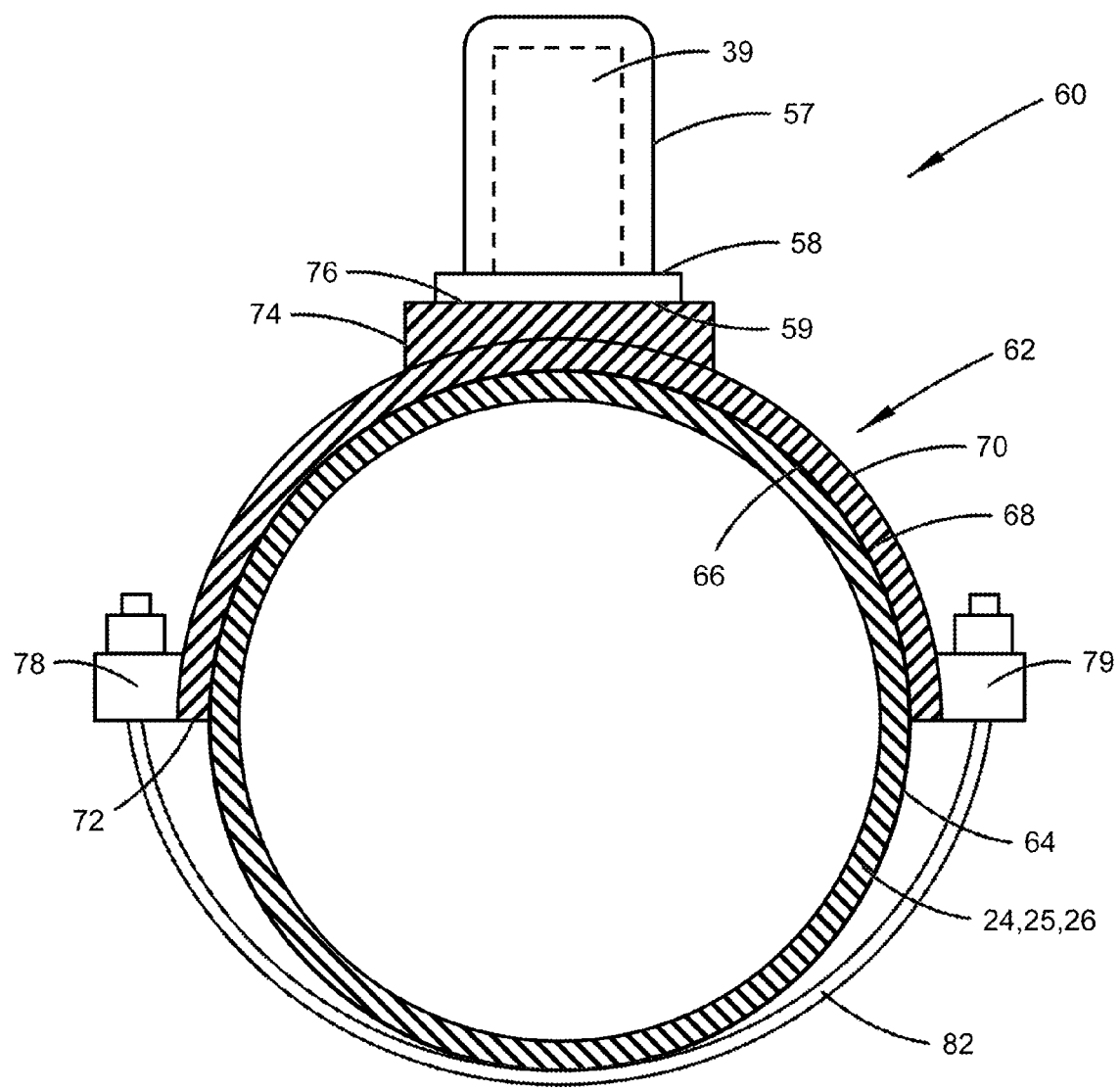
FIG. 3A is a top view illustration of selected elements of the heat dissipation assembly of the irrigation system shown in FIG. 1C in accordance with an example implementation of the prior art.

The variable-speed drive controller 39 of the variable-speed drive assembly 35 (as shown in FIG. 2B) may be housed inside an enclosure 57 with an enclosure base 58. The variable-speed drive controller 39 may be mounted onto the enclosure base 58 with an enclosure base surface 59 that may be located on an underside of the enclosure base 58 (as shown in FIG. 3A), and may be substantially planar in contour. In a preferred embodiment, the enclosure base surface 59 serves as a conductive heat sink for cooling or transferring heat away from the variable-speed drive controller 39.

Figure 3B:
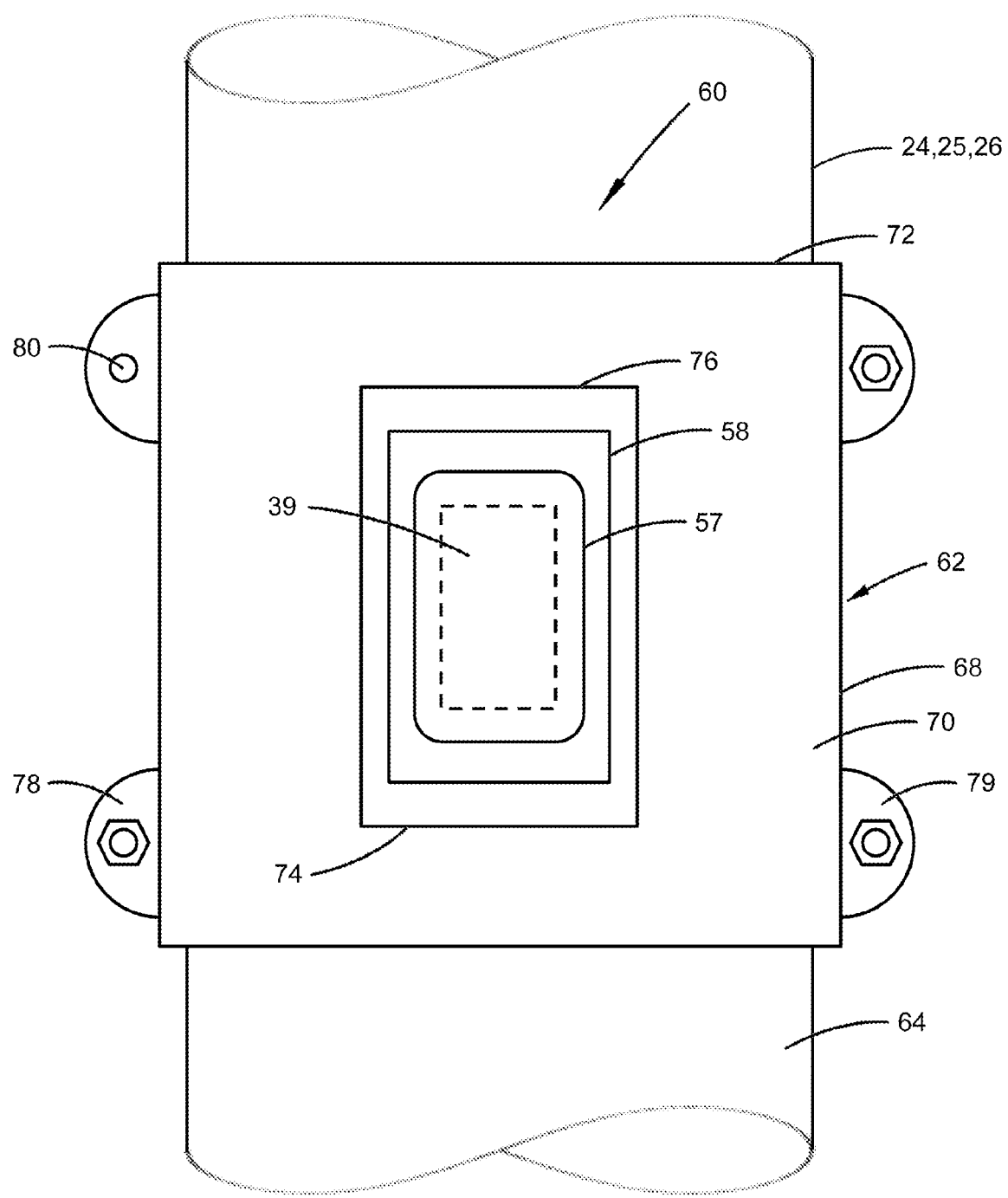
FIG. 3B is a is a side view illustration of selected elements of the heat dissipation assembly of the irrigation system shown in FIG. 1C in accordance with an example implementation of the prior art.

In another aspect, the present invention relates to heat dissipation assemblies 60 that may be configured to dissipate heat from the variable-speed drive controllers 39 and transfer the heat to the corresponding applicant conduits 24, 25, 26 (as shown in FIGS. 1C, 3A and 3B) and to the corresponding applicant (e.g., water) carried by the applicant conduits 24, 25, 26. The heat dissipation assemblies 60 may, thereby, serve to augment the cooling of the variable-speed drive controller 39. The heat dissipation assemblies 60 may be configured to mount onto the applicant conduits 24, 25, 26 in a manner that is suitable to transfer heat via conduction from the variable-speed drive controllers 39 to the corresponding applicant conduits 24, 25, 26 and to the corresponding applicant. The heat dissipation assemblies 60 may be conventionally mounted onto the applicant conduits 24, 25, 26 (as shown in FIGS. 3A and 3B), although the heat dissipation assemblies 60 may alternatively be wholly or partially integrated into the applicant conduits 24, 25, 26.

The heat dissipation assembly 60 may include a saddle 62 for mounting onto the corresponding applicant conduits 24, 25, 26. The saddle 62 may be configured to be positioned adjacent to or against an applicant conduit exterior surface 64. The saddle 62 may have a saddle surface interface 66 for positioning against the applicant conduit exterior surface 64, and the saddle surface interface 66 may have a shape that is complementary to the applicant conduit exterior surface 64 to facilitate contact between the two surfaces. As shown in FIG. 3A, the saddle surface interface 66 may correspond to a portion of a cylinder, such as being semi-cylindrical. The saddle 62 may comprise a saddle plate 68 that forms at least a portion of the saddle surface interface 66 and, furthermore, has a saddle plate outer surface 70 positioned opposite of the saddle surface interface 66. The saddle plate 68 may also have a saddle plate perimeter edge 72 extending between the saddle plate outer surface 70 and the saddle surface interface 66. The saddle 62 may also comprise a saddle platform 74 that may extend or protrude from the saddle plate outer surface 70 of the saddle plate 68 for mounting the variable-speed drive controller 39 thereon. The saddle platform 74 may have a saddle platform mount surface 76 for positioning adjacent to or against the enclosure base surface 59 of the enclosure 57 of the variable-speed drive controller 39 to facilitate heat transfer there between. The shape or contour of the saddle platform mount surface 76 may be complementary to the shape of the enclosure base surface 59 of the enclosure 57 of the variable-speed drive controller 39. In the preferred embodiment, the saddle platform mount surface 76 and the enclosure base surface 59 are substantially planar.

The saddle 62 may further comprise at least a first saddle mount 78 and a second saddle mount 79 on the saddle plate 68, and each of the first saddle mount 78 and second saddle mount 79 may be positioned toward opposite sides of the saddle plate perimeter edge 72 of the saddle plate 68 (as shown in FIGS. 3A and 3B). The first and second saddle mounts 78, 79 may both have a saddle mount aperture 80 formed therein, as shown in FIG. 3B. The heat dissipation assembly 60 may include at least one saddle mount retaining strap 82 configured to readily mount the saddle plate 68 to the applicant conduits 24, 25, 26, and the saddle mount retaining strap 82 may be readily mounted on the first saddle mount 78 and second saddle mount 79 located on opposite sides of the saddle plate perimeter edge 72 of the saddle plate 68. The saddle mount retaining strap 82 may have a substantially U-shaped configuration to loop about the portion of the corresponding applicant conduits 24, 25, 26 not circumscribed by the saddle plate 68. In a preferred embodiment, a pair of saddle mount retaining straps 82 may be utilized with two pairs of first saddle mount 78 and second saddle mount 79 to secure the saddle plate 68 to the applicant conduits 24, 25, 26 in a close relationship that is able to permit heat transfer from the saddle plate 68 to the applicant conduits 24, 25, 26, and then to the applicant (e.g., water) flowing through the applicant conduits 24, 25, 26.

In another embodiment, the heat dissipation assembly 60 may be mounted onto the applicant conduits 24, 25, 26 upside down (i.e., in a manner 180 degrees opposite to the orientation shown in FIG. 3A). Such alternative orientation of the heat dissipation assembly 60 may provide improved heat transfer as a result of heat rising vertically from the variable-speed drive controller 39 to the now above saddle 62. Additionally, such alternative orientation may result in less direct solar radiation onto the enclosure 57 of the variable-speed drive controller 39.

As shown in FIG. 2B, each variable-speed drive assembly 35 may include a variable-speed drive controller 39. A non-limiting list of suitable variable-speed drive controller 39 types includes an AC (alternating current) VFD (variable frequency drive), a variable-torque V/Hz (volts-per-hertz) control VFD, a flux control VFD, a DTC (direct torque control) VFD, a sensorless vector control VFD, a sensored vector control VFD, a brush type DC (direct current) variable-drive control unit, or a DC variable-drive control unit, and the like, all with or without an internal or an external microcontroller or an internal or an external PLC (programmable logic controller).

Although the subject matter has been described in language specific to structural features or process operations, it is to be understood that the subject matter defined in the appended claims is not necessarily limited to the specific features or acts described above. Rather, the specific features and acts described above are disclosed as example forms of implementing the claims.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An irrigation system having a movement direction over a ground surface of a field, the irrigation system comprising:
   a plurality of spans having an applicant conduit carrying applicant and having an axis;
   at least one tower structure supporting the spans above a ground surface; and
   a drive assembly for the tower structure having:
   (a) at least one wheel configured to contact a ground surface below the irrigation system;
   (b) at least one span motor configured to drive the wheels so as to propel the tower structure over the ground surface;
   (c) a drive controller having an enclosure and controlling operation of the span motor; and
   (d) a heat dissipation assembly mounted to the applicant conduit and contacting the enclosure of the drive controller, such that heat from the drive controller is conducted through the heat dissipation assembly to the applicant conduit and the applicant carried by the applicant conduit, said heat dissipation assembly configured as a saddle having: (i) a saddle plate having an interior surface extending along the axis of the applicant conduit and contoured to contact the applicant conduit; (ii) a platform extending along the axis of the applicant conduit in contact with the saddle plate, and mounting the enclosure of the drive controller thereon to facilitate conduction of heat from the drive controller through the heat dissipation assembly to the applicant conduit; and (iii) a saddle mount retaining strap extending around the applicant conduit for mounting the heat dissipation assembly to the applicant conduit.

2. The irrigation system of claim 1 wherein the platform of the heat dissipation assembly has a shape complementary to the base of the enclosure of the drive controller.

3. The irrigation system of claim 1 wherein the platform of the heat dissipation assembly and the base of the enclosure of the drive controller are substantially planar and in contact one with another.

\* \* \* \* \*